C. E. MASON.
ICE CREAM FREEZER.
APPLICATION FILED JUNE 12, 1914.
1,187,641.
Patented June 20, 1916.
2 SHEETS—SHEET 1.
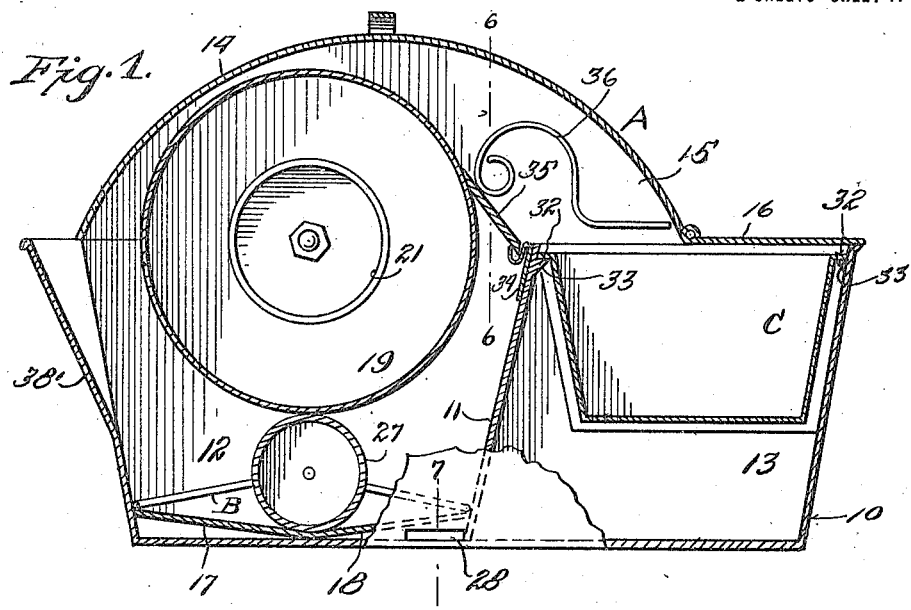
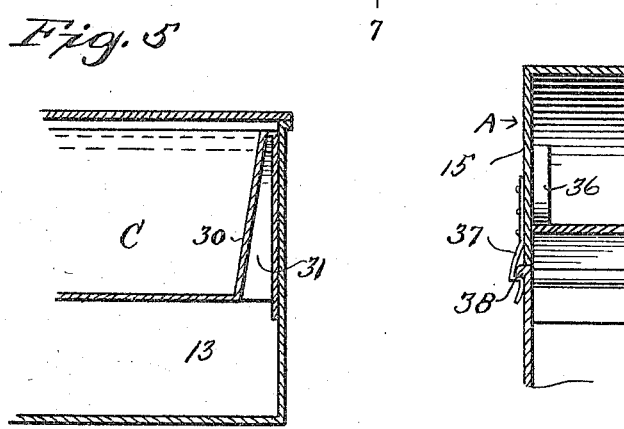
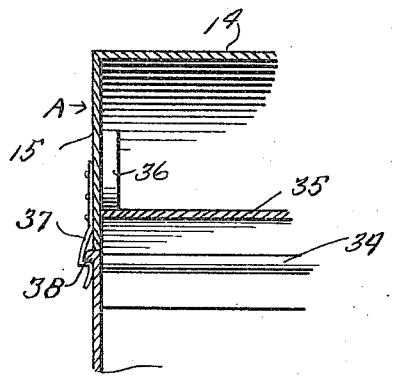
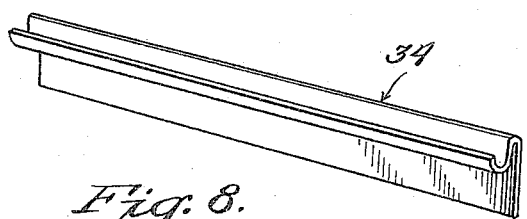
Witnesses
Inventor
C. E. Mason
By Chandler Chandler
Attorney C. E. MASON.
ICE CREAM FREEZER.
APPLICATION FILED JUNE 12, 1914.
1,187,641.
Patented June 20, 1916.
2 SHEETS—SHEET 2.
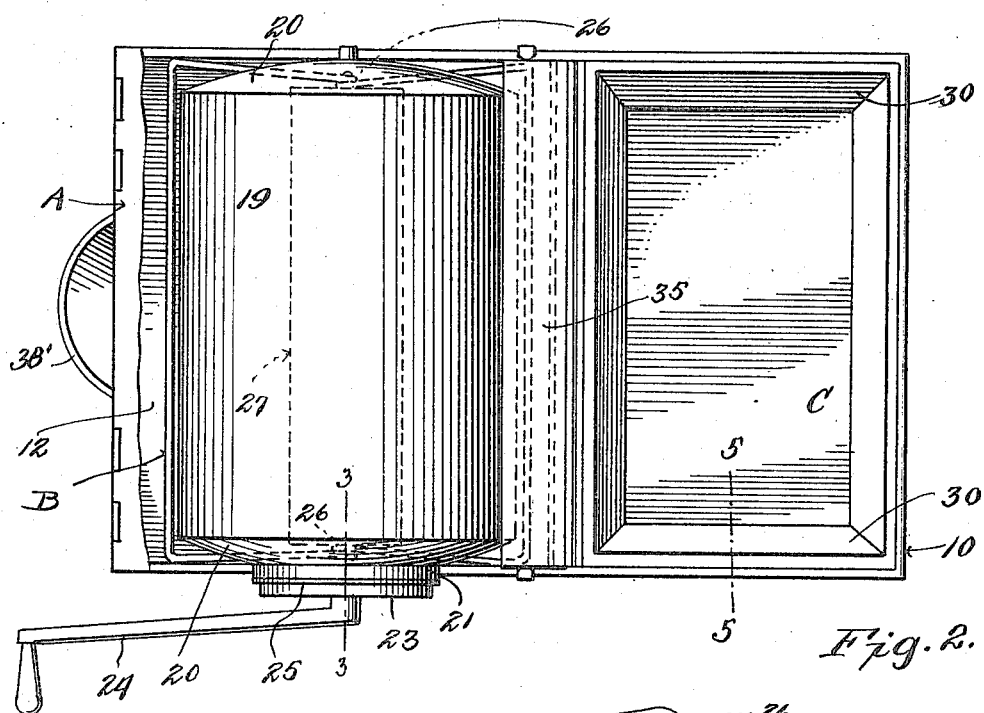
Fig. 2.
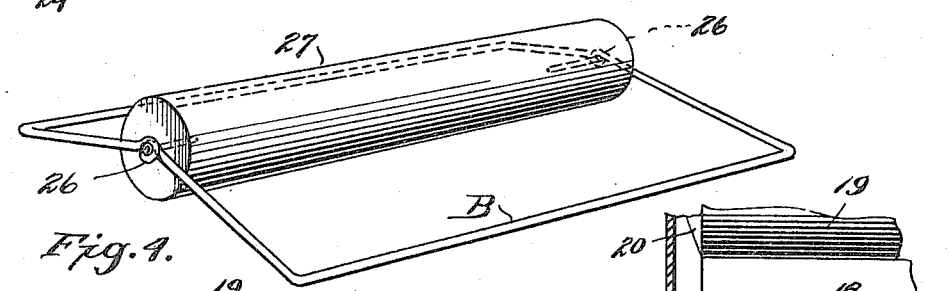
Fig. 4.
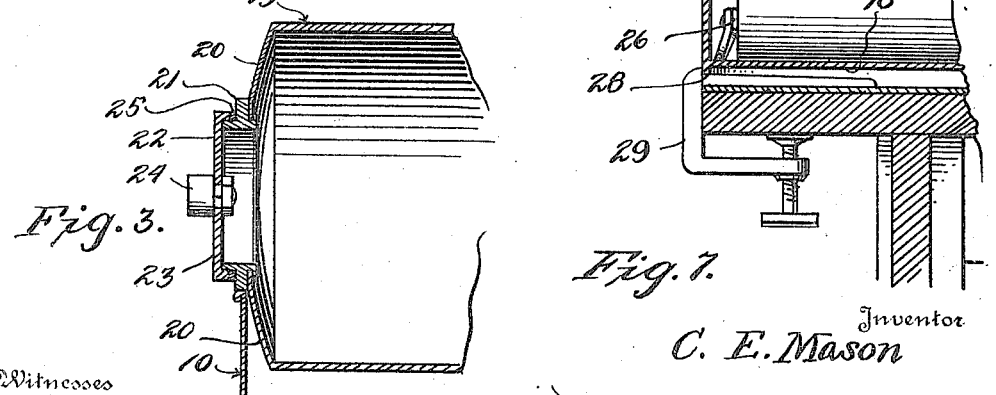
Fig. 3.   Fig. 7.
Inventor
C. E. Mason
Attorneys
Witnesses

UNITED STATES PATENT OFFICE.

CLARENCE E. MASON, OF NORWALK, OHIO.

ICE-CREAM FREEZER.

1,187,641.  Specification of Letters Patent.  Patented June 20, 1916.

Application filed June 12, 1914. Serial No. 844,773.

*To all whom it may concern:*

Be it known that I, CLARENCE E. MASON, a citizen of the United States, residing at Norwalk, in the county of Huron, State of Ohio, have invented certain new and useful Improvements in Ice-Cream Freezers; and I do hereby declare the following to be a full, clear, and exact description of the invention, such as will enable others skilled in the art to which it appertains to make and use the same.

This invention relates to ice cream freezers.

The object of the invention resides in certain improvements in that class of ice cream freezers which consist of a horizontal rotatable cylinder containing the freezing agent, in combination with a cream-receiving pan, a feed roller, and a scraper to remove the ice cream as made into a receptacle.

A further object of the invention resides in the provision of an ice cream freezer of the character named wherein the receptacle for receiving the ice cream is disposed in a cold air chamber in such manner that an efficient circulation of cold air is always present around the walls of the receptacle.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a longitudinal vertical section through an ice cream freezer constructed in accordance with the invention; Fig. 2, a plan view with the cover broken away; Fig. 3, a section on the line 3—3 of Fig. 2; Fig. 4, a perspective view of the spring structure which yieldingly holds the feed roller against the cylinder containing the freezing agent; Fig. 5, a section on the line 5—5 of Fig. 2; Fig. 6, a section on the line 6—6 of Fig. 1; Fig. 7, a section on the line 7—7 of Fig. 1 showing the manner of securing the freezer to a supporting element; and Fig. 8, a fragmental perspective view of the supporting member of the scraper.

Referring to the drawings the improved ice cream freezer is shown as comprising a tank body 10 provided with an inclined partition 11 forming a freezing compartment 12 and a cold air compartment 13. The upper end of the tank 10 is closed by a hinged cover A including a curved crown portion 14 and parallel side members 15. The free end of the cover A has hinged thereto an extension 16 which serves to close a portion of the tank over which the main portion of the cover A does not extend. The compartment 12 is provided with a false bottom including sections 17 and 18 inclined toward each other. Journaled in the side walls of the tank 10 and the cover A transversely of the compartment 12 and centrally of the latter is a cylinder 19 the ends of which are convexed as at 20 so as to prevent engagement of the ends of the cylinder with the side walls of the tank and cover. One end of the cylinder 19 is provided with an opening around which is disposed a tubular member 21 fixed to the cylinder and having a reduced threaded outer end 22.

Engaged on the outer end of the tubular member 12 is a cap closure 23 to which is fixed an operating handle or crank 24. By removing the cap 23 it will be obvious that the cylinder 19 can be filled with the desired freezing agent. A gasket 25 surrounds the reduced outer end of the tubular member 21 and is engaged by the cap 23 when the latter is screwed home to form a liquid and air tight joint.

It will be noted that the tubular member 21 constitutes one of the trunnions of the cylinder 19 and that the joint between the cap 23 and tubular member is disposed exteriorly of the tank 10 so that in the event of leakage none of the material in the tank will pass into the freezing compartment 12 where the material to be frozen is stored.

Disposed within the compartment 12 beneath the cylinder 19 is a spring frame B opposite side portions of which are looped centrally as at 26 and journaled in these loops are the trunnions of a feed roller 27. The spring B constantly tends to force the roller 27 into engagement with the cylinder 19, said roller being disposed directly over the junction of the sections 17 and 18 of the false bottom with its periphery relatively near said junction so as to be capable of transferring all the cream in the compartment 12 to the cylinder 19.

The outer bottom of the tank within the limits of the compartment 12 is provided with spaced openings 28 in which are engaged clamps 29 for the purpose of securing the tank 10 to a supporting element as will be obvious upon inspection of Fig. 7.

The receptacle for receiving the frozen cream is indicated at C and is shown as provided with inner end walls 30 which form cold air spaces 31, the bottom of the receptacle terminating at the inner end wall. The side walls of the receptacle C are provided at their upper edges with outwardly directed flanges 32 which engage over projections 33 on the partition 11 and one wall of the tank 10 for the purpose of supporting the receptacle C in the compartment 13. By providing the air spaces 31 it will be obvious that a circulation of cold air is always maintained around the receptacle C when ice is stored in the compartment 13.

Secured to the upper end of the partition 11 is a grooved-member 34 in which is seated one edge of a scraper 35, the other edge of said scraper bearing against the cylinder 19 and being yieldingly held in engagement with said cylinder by means of springs 36 mounted on the side walls of the cover A.

In order to secure the cover A in closed position the side members thereof have mounted thereon respectively spring latches 37 which engage over keepers 38 carried by the tank 10.

An inlet spout 38' is associated with the tank 10 whereby cream may be supplied to the compartment 12.

In operation it will be evident that when cream is supplied to the compartment 12 and ice and salt to the interior of the cylinder 19 rotation of said cylinder will effect rotation of the roller 27 so that a film of cream will be fed upon the surface of the cylinder 19 where it will immediately freeze. As the cylinder 19 rotates the scraper 35 will remove the frozen cream and deliver same to the receptacle C.

What is claimed is:

In an ice cream freezer the combination of a tank body having a freezing compartment and a cold air compartment, freezing mechanism within the cream compartment, a receptacle detachably mounted in the cold air compartment and adapted to receive the frozen cream from the freezing mechanism, said receptacle having its transverse walls converging downwardly and its longitudinal walls parallel, and inner longitudinal walls included in said receptacle and converging downwardly, the bottoms of said inner walls terminating adjacent the lower edge of the outer longitudinal walls whereby cold air pockets are formed at opposite sides of the receptacle.

In testimony whereof, I affix my signature, in the presence of two witnesses.

CLARENCE E. MASON.

Witnesses:
R. R. STIEHLAND,
MILLIE WOODMAN.

Copies of this patent may be obtained for five cents each, by addressing the "Commissioner of Patents, Washington, D. C."